United States Patent [19]
Kull

[11] Patent Number: 5,507,457
[45] Date of Patent: Apr. 16, 1996

[54] TRAIN INTEGRITY DETECTION SYSTEM

[75] Inventor: Robert C. Kull, Montgomery County, Md.

[73] Assignee: Pulse Electronics, Inc., Rockville, Md.

[21] Appl. No.: 387,072

[22] Filed: Feb. 13, 1995

[51] Int. Cl.⁶ .................................................. B61L 23/00
[52] U.S. Cl. .............................. 246/169 P; 364/424.03; 364/426.01
[58] Field of Search ......................... 246/7, 166, 169 R, 246/182 B, 189; 364/424.01, 424.03, 426.01

[56] References Cited

U.S. PATENT DOCUMENTS

| | | | |
|---|---|---|---|
| 4,041,470 | 8/1977 | Slane et al. | 364/424.04 |
| 4,682,144 | 7/1987 | Ochiai et al. | 246/166.1 |
| 4,718,622 | 1/1988 | Rahman | 246/169 R |
| 4,885,689 | 12/1989 | Kane et al. | 364/424.01 |
| 5,016,840 | 5/1991 | Bezos | 246/187 R |
| 5,039,038 | 8/1991 | Nichols et al. | 246/3 |
| 5,053,964 | 10/1991 | Mister et al. | 364/424.01 |
| 5,265,832 | 11/1993 | Wesling et al. | 246/169 R |
| 5,317,751 | 5/1994 | Novakovich et al. | 395/750 |
| 5,374,015 | 12/1994 | Bezos et al. | 246/169 R |
| 5,377,938 | 1/1995 | Bezos et al. | 246/169 R |

Primary Examiner—Robert J. Oberleitner
Assistant Examiner—S. Joseph Morano
Attorney, Agent, or Firm—Whitham, Curtis, Whitham & McGinn

[57] ABSTRACT

An improvement in an End-of-Train (EOT) monitor system allows the continuity of the brake pipe of a train to be verified. Obstructions in the brake-pipe, such as, for example, closed angle cocks, kinks, blockages, or breaks, adversely affect brake safety. A pressure sensor is installed in the Locomotive Cab Unit (LCU) to sense brake application. If the brake pipe is intact, a brake application initiated from the locomotive should correspondingly result in a drop in pressure at the EOT unit. The time require for the drop to propagate through the train is a function of train length. If a pressure drop is not sensed at the EOT unit within a predetermined period of time, it is assumed to be due to either a corrupted brake pipe or a communications failure between the LCU and EOT unit. A Microprocessor in the LCU initiates a communications check by interrogating the EOT unit from the LCU. If no reply is received, an alarm sounds warning the engineer of a communications failure. If, on the other hand, the LCU receives a reply from the EOT to the interrogation, a brake pipe continuity alarm is sounded warning the engineer of a brake fault condition.

6 Claims, 2 Drawing Sheets

TRAIN INTEGRITY DETECTION SYSTEM

BACKGROUND OF THE INVENTION

1. Field of the Invention

The present invention generally relates to improvements in railroad telemetry and control systems and, more particularly, to improvements in End of Train (EOT) monitoring systems which allow the additional function of checking brake pipe integrity of the train.

2. Description of the Prior Art

Railroads in North America currently use "End-of-Train" (EOT) monitor systems as a means of eliminating the need for cabooses. Current EOT monitor systems, such as Pulse Electronics' "TrainLink II" system, are designed to perform two basic functions. In the first of these functions, the EOT unit monitors brake pipe pressure, motion, and other parameters, and communicates the information via dam radio to the Locomotive Cab Unit (LCU). EOT data communications are initiated at approximately one minute intervals, with no change in monitored parameters, and less than two pound per square inch (psi) change in brake pipe pressure. If parameters change, or brake pipe pressure changes by at least two psi, communication is immediately initiated. Therefore, a rapid brake pipe pressure reduction would result in a series of dam transmissions, approximately one second apart.

In the second function, the EOT monitoring system allows the engineer to initiate an emergency brake application from the LCU to the EOT unit, via the dam radio link. This provides a means of rapidly exhausting the brake pipe from the rear of the train, supplementing normal emergency braking initiated from the locomotive (front) end of the train. It will be observed that this second function differs from the first in that in the first function data is simply gathered by the EOT unit and transmitted to the LCU, whereas in the second function, the LCU transmits a command to the EOT causing it to do something, namely open a brake pipe valve.

End-of-Train monitoring systems have become ubiquitous in trains operating in North America, and there is a continuing process of adding functions to these systems in order to improve the safety and operational control provided.

SUMMARY OF THE INVENTION

It is therefore an object of the present invention to provide an additional pressure monitoring function for an End-of-Train monitoring system which will enable an integrity check of the train on which it is installed.

According to the invention, there is provided a pressure input capability and software to the LCU microprocessor which allows the continuity of the brake pipe of a train to be verified. Obstructions in the brake-pipe, such as, for example, closed angle cocks, kinks, blockages, or breaks, adversely affect brake safety. A pressure sensor is installed in the LCU to sense brake application. If the brake pipe is intact, a brake application initiated from the locomotive should correspondingly result in a drop in pressure at the EOT unit. The time required for the drop to propagate through the train is a function of train length. If a pressure drop is not sensed at the EOT unit within a predetermined period of time, it is assumed to be due to either a corrupted brake pipe or a communications failure between the LCU and EOT unit. The microprocessor in the LCU initiates a communications check by interrogating the EOT unit from the LCU. If no reply is received, an alarm sounds warning the engineer of a communications failure. If, on the other hand, the LCU receives a reply from the EOT to the interrogation, a brake pipe continuity alarm is sounded warning the engineer of a brake fault condition.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
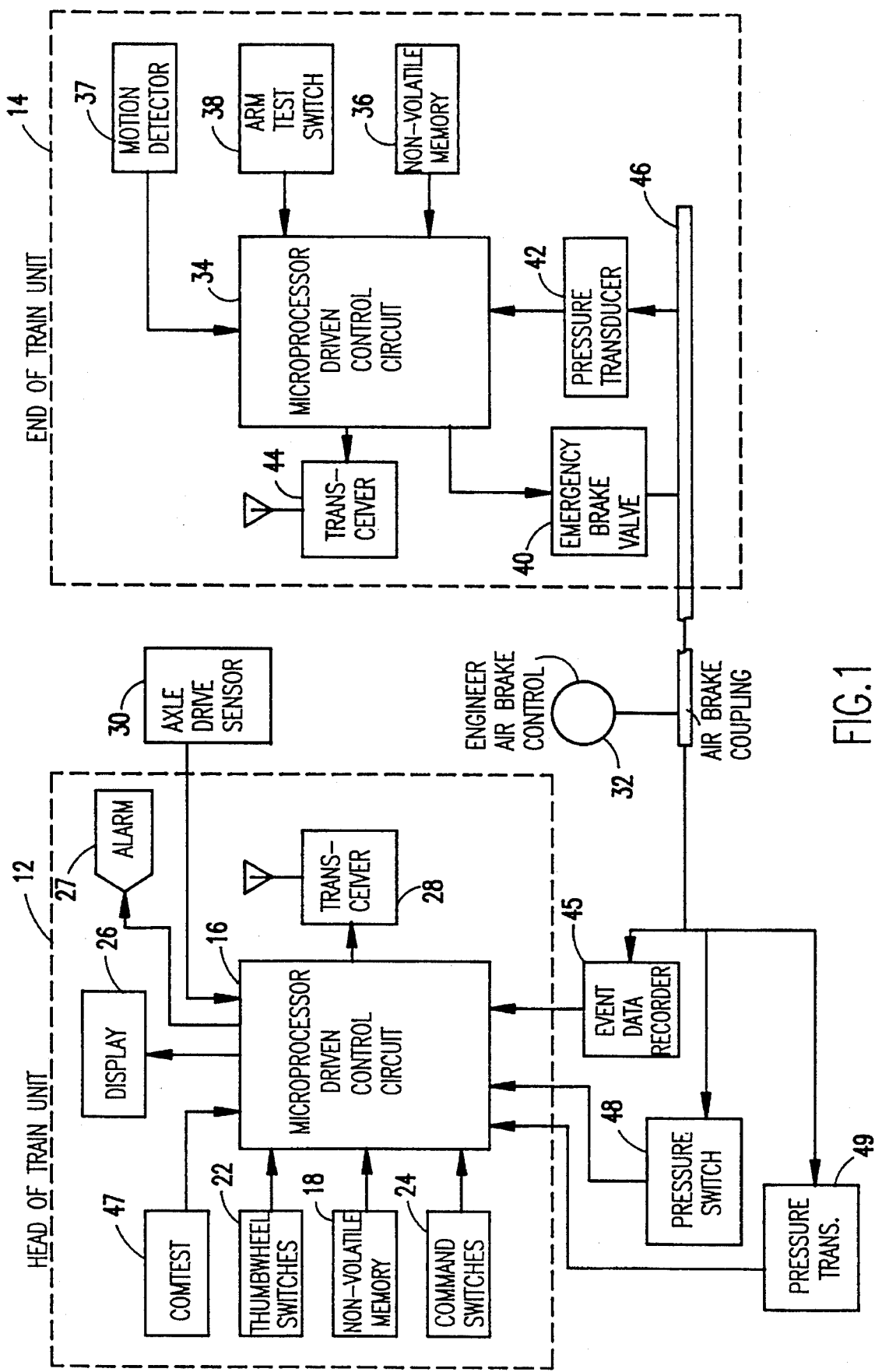
FIG. 1 is block diagram showing the major component parts of an EOT monitoring system including an EOT unit and an LCU.

Referring now to the drawings, and more particularly to FIG. 1, there is shown a block diagram of a locomotive control unit (LCU) 12 and an end of train (EOT) unit 14 mechanically linked together by a train (not shown) and communicating by radio broadcast. The EOT unit 14 is typically mounted on the trailing coupler (not shown) of the last car in the train and is equipped with pressure monitoring and telemetry circuitry. A hose is connected between the train's brake pipe and the EOT unit so that the air pressure of the brake pipe at the end of the train can be monitored.

The LCU 12 includes microprocessor control circuit 16, a nonvolatile memory 18 which stores the control program for the microprocessor control circuit, and a series of thumb wheel switches 22 through which an operator stationed at tile LCU can manually enter the unique code number of tile EOT unit 14. In addition to inputs from the thumb wheel switches and nonvolatile memory, the microprocessor control circuit 16 also has a command switch input 24 and a communication test (COMTEST) switch input 47 and provides outputs to a display 26, an audible alarm 22, and transceiver 28. A locomotive engineer controls air brakes via the normal locomotive air brake controls, indicated schematically at 32, and the normal air brake pipe 46 which extends the length of the train. Existing LCUs are connected to the locomotive's axle drive via an axle drive sensor 30 which provides typically twenty pulses per wheel revolution.

The EOT unit 14 includes a microprocessor control circuit 34, and a nonvolatile memory 36 in which the control program for the microprocessor controller and a unique identifier code of the particular EOT unit 14 are stored. The microprocessor control circuit 34 also has inputs from a motion detector 37, a manually activated arming and test switch 38 and a brake pressure responsive transducer 42 and an output to an emergency brake control unit 40 coupled to the brake pipe 46. The EOT unit 14 communicates with radio transceiver 28 of the LCU 12 by way of a radio transceiver 44.

In addition, at the front of the train (e.g., the locomotive) there is typically an event data recorder 45 which is coupled to the brake pipe 46 at the locomotive. An output of data recorder 45 is coupled to the LCU microprocessor control circuit 16 so that changes in brake pressure at the locomotive end of the brake pipe are coupled to the microprocessor control circuit 16. A pressure switch 48 is also connected to the brake pipe 46 and provides an output directly to the microprocessor control circuit 16. The function of the pressure switch 48, which has a typical threshold on the order of 25 psi, is to sense and communicate to the LCU 12 the arrival of an emergency brake application.

In the practice of the present invention, the output pressure provided by the data recorder 45 is monitored by the microprocessor control circuit 16. In the alternative if a dam recorder is not present, a pressure transducer 49 may be provided to receive the same pneumatic signal as the pressure switch 48. The pressure transducer 49 would provide an input to the microprocessor control circuit 16 whenever the engineer air brake control 32 is actuated. That is, the pressure transducer 49 would, like the data recorder 45, output an interrupt to the microprocessor control circuit 16 whenever there is a reduction in pressure at the LCU caused by the application of the air brake control. This reduction in pressure propagates down the brake pipe 46 to the EOT unit 14 where it is sensed by pressure transducer 42. Upon receiving an interrupt from the pressure transducer 42, the microprocessor control circuit 34 communicates this to the LCU via transceivers 44 and 28.

In the LCU microprocessor control circuit 16, a software timer is started whenever an interrupt is received from data recorder 45 or pressure transducer 49. This timer has a time duration equal to the longest expected time for the pressure wave to propagate on the brake-pipe 46 to the EOT unit 14 and the EOT unit microprocessor control circuit 34 to process this information and communicate it back to the LCU 12 via transceivers 44 and 28. This time is a function of the length of the train and rate of propagation of a pressure wave in the brake pipe and can be predetermined when the train consist is assembled in the train yard. The predetermined time may then be entered in the LCU microprocessor control circuit 16 by means of command switches 24, for example.

When the communication is received from the EOT 14, the LCU microprocessor control circuit 16 software timer is reset, but if the timer times out without being reset, a fault condition is detected. This fault condition could be from two different sources; either the pressure drop is not sensed at the EOT unit 14 within the predetermined period of time, due to either a corrupted brake pipe, or there is a communications failure between the and EOT unit 14 and the LCU 12. To determine which source caused the fault condition, the microprocessor control circuit 16 in the LCU initiates a communications check by interrogating the EOT unit 14 from the LCU via transceivers 28 and 44. If no reply is received, alarm 27 sounds and the display 26 displays a message warning the engineer of a communications failure. If, on the other hand, the LCU 12 receives a reply from the EOT unit 14 in response to the interrogation, a brake pipe continuity alarm is sounded on alarm 27 and the display 26 displays a message warning the engineer of a brake fault condition.

Figure 2:
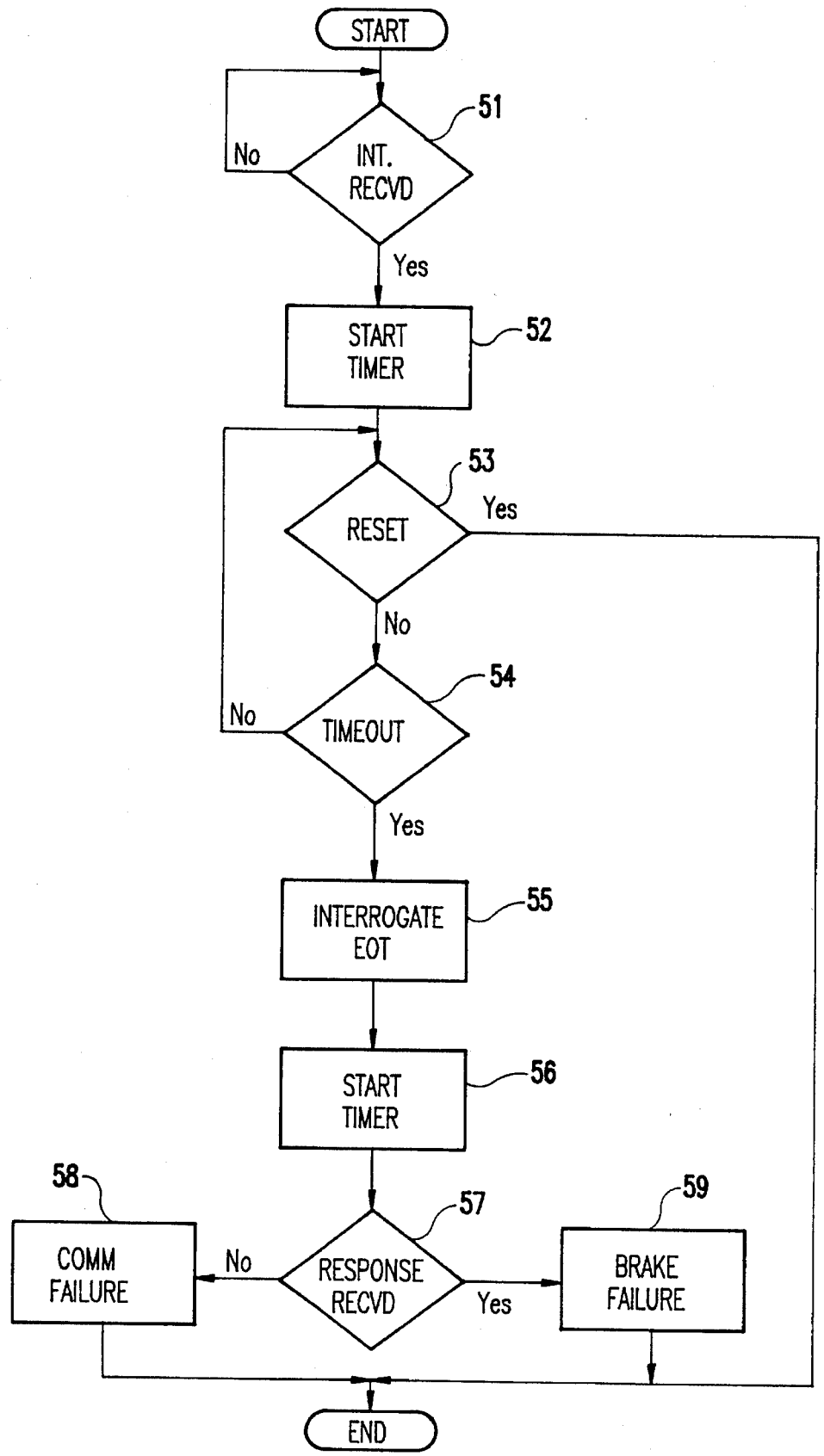
FIG. 2 is a flow diagram showing the software run by the LCU microprocessor implementing integrity check according to the invention.

FIG. 2 shows the logic of the software implemented on the LCU microprocessor control circuit 16 to provide the integrity check according to the present invention. Upon detecting a pressure reduction due to actuation of the air brake control 32, the data recorder 45 or, in the alternative, the pressure transducer 49 generates an interrupt to the microprocessor control circuit 16. In FIG. 2, this is detected by decision block 51, and when detected, a software timer is started in function block 52. While the timer is running, a check is made in decision block 53 to determine if the timer has been reset. If not, a further check is made in decision block 54 to determine if the timer has timed out. If not, the process loops back to decision block 53. When the timer is reset as a result of receiving a communication from the EOT unit 14, the process ends. However, if the timer times out, then the EOT unit 14 is interrogated in function block 55. This is similar to the COMTEST switch input 47, except that it is initiated by the software rather than in response to a manual actuation of the switch. A second timer is started in function block 56 when EOT unit 14 is interrogated. This timer already exists in other software which also checks in decision block 57 to determine if a response to the interrogation is received within a prescribed time period. If not, then a communications failure has been detected, and the engineer is alerted in function block 58 by sounding the alarm 27 and providing a suitable message on display 26. If on the other hand, the communication link is verified by the interrogation of EOT unit 14, the software concludes in function block 59 that the fault is caused by corruption of the brake pipe. The alarm 27 is sounded and a suitable message is provided to display 26 indicating the brake fault condition.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A train integrity detection system for sensing faults in a brake pipe traversing the length of a train, comprising:

a locomotive cab unit positioned at the head-end of a train, said locomotive cab unit comprising a first transceiver and a first brake pipe pressure sensor for sensing a brake application, said locomotive cab unit including a timer which is started when said first brake pipe pressure sensor senses a brake application, said timer defining a predetermined time duration;

an end-of-train unit for monitoring brake pipe pressure at a rear-end of the train, said end-of-train unit comprising a second transceiver in radio communication with said first transceiver and a second brake pipe pressure sensor for sensing a reduction in pressure due to a brake application, said end-of-train unit transmitting a radio signal to said locomotive cab unit when a reduction in brake pipe pressure is sensed by said second brake pipe pressure sensor to communicate a brake pipe pressure change;

reset means at said locomotive cab unit for resetting said timer upon receipt of said radio signal transmitted by said end-of-train unit; and alarm means at said locomotive cab unit for notifying an engineer that said timer has timed out without being reset during said predetermined time duration thereby indicating that a failure in the train integrity.

2. The train integrity detection system recited in claim 1 wherein said alarm means comprises:

means for causing said locomotive cab unit to interrogate said end-of-train unit if said end-of-train unit fails to transmit said radio signal communicating a brake pipe pressure change in response to a brake application within said predetermined time duration defined by said timer;

a communications fault alarm connected to said locomotive cab unit which is activated if said end-of-train unit fails to reply when interrogated; and a brake pipe integrity alarm connected to said locomotive cab unit which is activated if said end-of-train unit replies when interrogated.

3. The train integrity detection system recited in claim 2 further comprising:

means for inputting to the locomotive cab unit a length of the train to calculate a pressure propagation time; and means for establishing the predetermined time duration defined by said timer as a function of said pressure propagation time.

4. A method sensing faults in a brake pipe traversing a length of a train comprising the steps of:

sensing at a head of the train an application of brakes as a reduction of pressure of the brake pipe;

starting a timer upon sensing an application of brakes, said timer defining a predetermined time duration;

monitoring brake pipe pressure at an end of the train;

transmitting a radio signal from the end of the train to the head of the train when a change in monitored brake pipe pressure is detected;

resetting said timer upon receipt of said radio signal; and actuating an alarm to notify an engineer the timer has timed out without being reset during said predetermined time duration thereby indicating a failure in the train integrity.

5. The method recited in claim 4 wherein the step of actuating an alarm comprises the steps of:

interrogating the end of the train if the timer is not reset within the predetermined time duration defined by said timer;

activating a communications fault alarm if the end of the train fails to reply when interrogated; and activating a brake pipe integrity alarm if said end of the train replies when interrogated.

6. The method recited in claim 5 further comprising the steps of:

inputting to the locomotive cab unit a length of the train to calculate a pressure propagation time; and establishing the predetermined time duration defined by said timer as a function of said pressure propagation time.

* * * * *